Feb. 25, 1969   C. W. KRYSTYNIAK   3,429,962
METHOD OF FORMING A METALLIC OXIDE ARTICLE
Filed Dec. 1, 1965
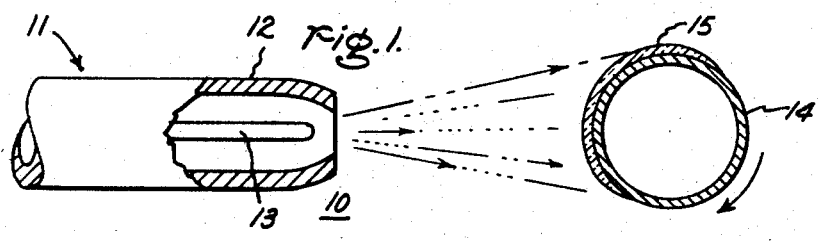
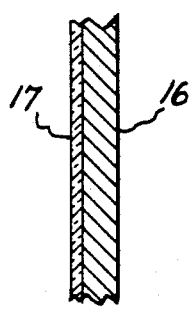
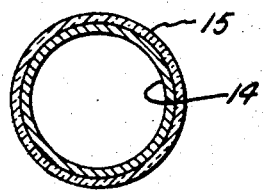
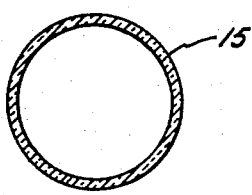
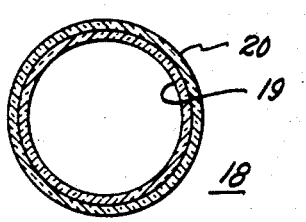
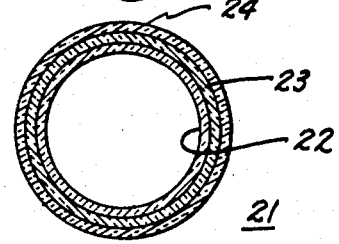
Inventor:
Casimir W. Krystyniak,
by Paul R. Webb, II
His Attorney.

United States Patent Office 3,429,962
Patented Feb. 25, 1969

1

3,429,962
METHOD OF FORMING A METALLIC OXIDE
ARTICLE
Casimir W. Krystyniak, Schenectady, N.Y., assignor to General Electric Company, a corporation of New York
Filed Dec. 1, 1965, Ser. No. 510,931
U.S. Cl. 264—309          1 Claim
Int. Cl. B32b 1/14

ABSTRACT OF THE DISCLOSURE

The preparation of metallic oxide layers and bodies consisting thereof by the plasma spray deposition of substantially spherically-shaped agglomerate particles of metal oxides, the particles being substantially uniform in composition and having as at least one of the metal oxides an oxide of a refractory metal, is described. Specific examples include a free-flowing powder of such spherical particles containing in physical combination (a) a metal oxide selected from the group consisting of unstabilized zirconia and undoped thoria and (b) a metal oxide selected from the group consisting of CaO, a mixture of rare earth oxides, $Y_2O_3$ and $Yb_2O_3$ and the deposition of such a powder by plasma arc spraying. As the result of this method of deposition the unstabilized $ZrO_2$ becomes stabilized or the undoped $ThO_2$ becomes doped.

---

This invention relates to methods of forming metallic oxide articles, and more particularly to methods of plasma-arc spray forming of metallic oxide articles.

A metallic oxide article, which is composed of several component metallic oxides, requires a uniform composition in which there is an intimate mixture of the component oxides. However, when such a metallic oxide article is simply blended by conventional powder techniques from a mixture of several component metallic oxides, uniformity is difficult to attain. The non-uniformity is caused by a segregation of the component metallic oxides of the metallic oxide powder subsequent to preparation, segregation after mixing or blending, segregation in slurry preparation, and segregation after application of the slurry.

My present invention is directed to an improved method of forming a metallic oxide article which has a uniform composition and an intimate mixture of the powder particles. My method of forming metallic oxide articles is particularly suitable in the preparation of metallic oxide components for high temperature fuel cells.

It is an object of my invention to provide an improved method of forming a metallic oxide article.

It is another object of my invention to provide an improved method of forming a metallic oxide article wherein a metallic oxide powder is employed which consists of spherical agglomerate particles.

It is a further object of my invention to provide an improved method of forming a metallic oxide article wherein at least one metallic oxide powder consisting of spherical agglomerate particles is plasma arc sprayed onto a mandrel, and the mandrel is removed subsequently.

In carrying out my invention in one form, a method of forming a metallic oxide article comprises providing a metallic oxide powder with spherical agglomerate particles consisting of a metallic oxide powder characterized by oxygen-ion conductivity upon stabilization, and a stabilizing metallic oxide powder, plasma arc spraying the particles of the metallic oxide powders onto a mandrel, and removing the mandrel.

These and various other objects, features and advantages of the invention will be better understood from the following description taken in connection with the accompanied drawing in which:

FIG. 1 is a schematic view of apparatus for carrying out the method embodying my invention;

FIG. 2 is a sectional view of a portion of a modified mandrel with a metallic oxide article formed thereon;

FIG. 3 is a sectional view of the mandrel shown in FIG. 1 of the drawing which mandrel has a metallic oxide article thereon;

FIG. 4 is a sectional view of a metallic oxide article formed in accordance with my method;

FIG. 5 is a sectional view formed of another metallic oxide article formed in accordance with my invention; and FIG. 6 is a sectional view through another metallic oxide article formed in accordance with my invention.

In FIG. 1 of the drawing there is shown schematically apparatus 10 for carrying out the methods of my invention. Apparatus 10 comprises a plasma arc spray gun 11, the nozzle portion 12 of which is shown. An electrode 13 positioned within nozzle portion 12. Gun 11 has the outlet end of its nozzle portion 12 spaced from and directed toward a rotatable mandrel 14, for example of copper or aluminum. A partially formed metallic oxide article 15 is shown on the outer surface of mandrel 14 which is rotatable by any suitable equipment (not shown).

In FIG. 2 of the drawing there is shown a portion of a modified mandrel 16 with the metallic oxide article 17 formed thereon. If modified mandrel 16 of FIG. 2 is employed in my process it is substituted for mandrel 14 in FIG. 1. Mandrel 16 in FIG. 2 of the drawing is stationary and would be spaced from nozzle portion 12 of gun 11 in FIG. 1. Plasma arc spray apparatus 10 which is shown on FIGS. 1 and 2 of the drawing and described above is suitable for forming metallic oxide articles in accordance with the method of my invention. Various modifications of this apparatus which are shown in these figures are also employed in the preparation of such metallic oxide articles.

I found that a very satisfactory metallic oxide article with a uniform composition and particles intimately mixed when fused is formed by providing a metallic oxide powder with spherical agglomerate particles consisting of a metallic oxide powder characterized by oxygen-ion conductivity upon stabilization, and a stabilizing metallic oxide powder, plasma arc spraying the particles of metallic oxide powder onto a mandrel, and removing the mandrel. A suitable method of removing the mandrel is to etch away the mandrel material by means of a chemical etching solution such as a 30–50 percent concentration of nitric acid for copper, and hydrochloric acid for aluminum.

I found also that I form other very satisfactory metallic oxides by providing various metallic oxide powders, each of which consists of spherical agglomerate particles, plasma arc spraying particles of each of these metallic oxide powders onto a removable mandrel and removing subsequently the mandrel thereby resulting in the metallic oxide article.

Another suitable metallic oxide article is formed in accordance with my above method in which there is provided initially in the spherical agglomerate particles of the metallic oxide powder a second metallic oxide selected from the group consisting of iron oxide, cobalt oxide, nickel oxide, titanium oxide, zinc oxide, titanium oxide-iron oxide, zinc oxide-iron oxide, zinc oxide-lead oxide, and 2 weight percent to 40 weight percent of uranium dioxide. Another suitable metallic oxide article is formed in accordance with my method wherein there is provided in the spherical agglomerate particles of the metallic oxide powder 2 weight percent to 40 weight percent of uranium dioxide, and a third metallic oxide selected from the group consisting of iron oxide, cobalt oxide, nickel oxide, titanium oxide, zinc oxide, titanium oxide-iron oxide, zinc oxide-iron oxide, and zinc oxide-lead oxide.

I found further that a very satisfactory metallic oxide composite article is formed by providing a first powder of metallic oxide spherical agglomerate particles consisting of a metallic oxide characterized by oxygen ion conductivity, when stabilized by a stabilizing metallic oxide also provided in the spherical agglomerate particles, a second powder of spherical agglomerate particles selected from a group consisting of iron oxide, cobalt oxide, nickel oxide, titanium oxide, zinc oxide, titanium oxide-iron oxide, zinc oxide-iron oxide, zinc oxide-lead oxide, 2 weight percent to 40 weight percent of uranium dioxide, 2 weight percent to 40 weight percent of the uranium dioxide and iron oxide, 2 weight percent to 40 weight percent of uranium dioxide and cobalt oxide, 2 weight percent to 40 weight percent of uranium dioxide and nickel oxide, 2 weight percent to 40 weight percent uranium dioxide and titanium oxide, 2 weight percent to 40 weight percent of uranium dioxide and zinc oxide, 2 weight percent to 40 weight percent uranium dioxide-titanium oxide-iron oxide, 2 weight percent to 40 weight percent of uranium dioxide-zinc oxide-iron oxide, and 2 weight percent to 40 weight percent uranium dioxide-zinc oxide-lead oxide, plasma arc spraying separately the particles of each of the first and second metallic oxide powders onto a removable mandrel, and removing the mandrel thereby forming the composite article.

In the formation of the above metallic oxide article, my method includes spraying either the first or the second metallic oxide powder onto the removable mandrel and then spraying the other powder on the surface of the first metallic oxide powder to form a composite article. Another very suitable metallic oxide composite article is formed in accordance with my above method which includes spraying the second metallic oxide powder onto the mandrel first, spraying the first metallic oxide powder onto the surface of the second metallic oxide powder, and then spraying the second metallic oxide powder onto the surface of the first metallic oxide powder thereby forming a composite article.

The principal metallic oxides which are characterized by oxygen ion conductivity upon stabilization are zirconia and thoria. Each of these metallic oxides serves as an oxygen-ion transport medium by virtue of the anion vacancies generated in the metallic oxide structure upon cathodic substitution of metal from the stabilizing metal oxide for metal from the initial metallic oxide. Upon stabilization the metallic oxide is resistant to large volume changes upon thermally cycling and hence is mechanically stable. The stabilized metallic oxide becomes a low-resistance ionic conductor.

The stabilizing metallic oxide comprises at least one or a combination of several specific oxides, such as calcium oxide, yttrium oxide, and ytterbium oxide or mixture of rare earth oxides. For example, a suitable metallic oxide material comprises zirconia which is stabilized with 15 molecular percent calcium oxide. Other compositions of stabilized zirconia are shown for example in "Oxide Ceramics" by Ryshkewitch, Academic Press, 1960, particularly on pages 354, 364, and 376 thereof. When thoria, a metallic oxide characterized by oxygen-ion conductivity upon stabilization is stabilized by the addition of one or more of the above stabilizing metallic oxides, the stabilized thoria is referred to as doped thoria rather than stabilized thoria. For example, a suitable doped thoria consists of thoria which is doped with the addition of 4 molecular percent calcium oxide.

When the above metallic oxide powders are combined in the form of spherical agglomerate particles of the component metallic oxides, such powders exhibit superior properties of uniform composition and of free-flowing characteristics. These powders of spherical agglomerate particles provide a material which is more effectively plasma arc sprayed to provide a metallic oxide article of uniform composition.

The above metallic oxide powders with spherical agglomerate particles are prepared as described and claimed in my copending application Ser. No. 510,886, filed Dec. 1, 1965, now issued as United States Patent No. 3,373,119. The above patent is assigned to the same assignee as the present application. Such metallic oxide powders in the form of spherical agglomerate particles are prepared by providing the component metallic oxide powders, blending these component metallic oxide powders, preparing a slurry of the blended oxide powders, spray drying the slurry thereby producing a powder with spherical agglomerate particles, and collecting the spray-dried powder. This method of preparing powders produces a superior metallic oxide powder with the particles in the form of spherical agglomerates of component metallic oxides having a specific, uniform composition and free-flowing characteristics which prevents non-uniformity in the powder.

For example, a metallic oxide powder characterized by oxygen ion conductivity upon stabilization, such as zirconia, is blended with a stabilizing metallic oxide powder such as calcia. A slurry of these blended powders is then prepared. In the preparation of such a slurry a liquid comprising water, alcohol and inorganic binder is added to the blended oxide powders to provide the slurry. The slurry of the blended oxide powders and liquid is then spray-dried by spray-drying equipment 30 as described further in the above-mentioned Patent No. 3,373,119. The spray-dried powder is next collected and comprises spherical agglomerate particles of component metallic oxide powders which powder has a uniform composition and free-flowing characteristics. In a similar manner, other powders which are employed in my present method are prepared in accordance with the above-identified copending patent application.

In the operation of the plasma arc spray apparatus 10 shown in FIG. 1 of the drawing, plasma arc spray gun 11 employs a carrier gas such as argon which flows through nozzle portion 12 thereof and its outlet end. When gun 11 is activated, the electrical current supplied thereto strikes an arc between electrically conductive nozzle portion 12 and electrode 13. In this manner, argon gas flowing through the outlet of nozzle portion 12 is ionized to form argon ions whereby a plasma is created and directed towards mandrel 14. A metallic oxide powder comprising spherical agglomerate particles consisting of a metallic oxide characterized by exhibiting oxygen-ion conductivity when stabilized such as zirconia, and a stabilizing metallic oxide such as calcia is supplied to gun 11 and flowed through its nozzle portion 12 in the argon carrier gas. Plasma formed by the ionized gas heats the spherical agglomerate particles to form a spray of molten metal oxide which is carried by the plasma and deposited upon the surface of mandrel 14.

Mandrel 14, which constructed of a material such as a thin-walled copper tube or a thin-walled aluminum tube is rotated about its axis by any suitable type of equipment (not shown). I prefer such a mandrel tube with a thickness between $\frac{1}{16}$ inch to $\frac{1}{32}$ inch. In this manner as it is shown in FIG. 1, mandrel 14 rotates clockwise thereby providing for a uniform deposit produced by the impact of the molten metallic oxide particles upon the entire surface of the mandrel. A modified form of mandrel is shown in FIG. 2 wherein mandrel 16 is a flat plate of material such as copper or aluminum, on which is shown a deposit 17 of metallic oxides which deposit has been produced by plasma arc spraying from gun 11. When mandrel 16 is employed, this stationary mandrel replaces rotatable mandrel 13 and is positioned from the end of gun nozzle 12. Otherwise the procedure for depositing metallic oxides on its surface is the same as deposit of the metallic oxides upon the surface of the rotating mandrel 13.

In FIG. 3 of the drawing there is shown mandrel 14 with a uniform coating or deposit of metallic oxides thereon. This deposit of metallic oxides has been produced in accordance with the method disclosed in FIG. 1 of the drawing.

In FIG. 4 of the drawing there is shown a metallic oxide article 15 of uniform composition which article was deposited initially on mandrel 14 which is shown in both FIGS. 1 and 3 of the drawing. After the deposit of metallic oxides on mandrel 14 has been accomplished to the thickness by plasma-arc spraying, plasma arc spray gun 11 is turned off and the rotation of mandrel 14 is stopped. After metallic oxide composition 15 has cooled to room temperature, mandrel 14 with metallic oxide composition 15 thereon is removed from the rotating equipment for mandrel 14 and is shown in FIG. 3 of the drawing.

The metallic oxide composition 15 on mandrel 14 is removed from mandrel 14 by removal of mandrel 14. This removal of the mandrel 14 is accomplished, for example, by etching out mandrel 14 through the employment of a suitable chemical etching agent. For example, if a copper mandrel is employed, the mandrel is preferably dipped in a solution of 30–50 percent concentration of nitric acid whereupon the material of the mandrel is etched away. It is then desirable to dip the metallic oxide article in a rinse of ethylenediamine tetraacetic acid to remove the final traces of copper. The article is rinsed in water and allowed to dry. Such an article is shown in section in FIG. 4 of the drawing. If an aluminum mandrel is employed, the mandrel is preferably dipped in a solution of hydrochloric acid whereupon the material of the mandrel is etched away. Subsequently, the article is rinsed in water and dried.

When a metallic oxide article is formed in accordance with my method from metallic oxide spherical agglomerate particles consisting of a metallic oxide characterized by exhibiting oxygen ion conductivity when stabilized, and a stabilizing metallic oxide this article is useful, for example as a solid electrolyte for a high temperature fuel cell.

In FIG. 5 of the drawing there is shown a composite metallic oxide article 18 which comprises a first metallic oxide 19, and a second metallic oxide 20 adhering firmly to the surface of the first metallic oxide 19. This article is made in accordance with my method employing the apparatus which is shown in FIG. 1 of the drawing.

In FIG. 6 of the drawing there is shown a composite metallic oxide article 21 which comprises a first metallic oxide 22, a second metallic oxide 23 adhering to the exterior surface of first metallic oxide 22, and a third metallic oxide 24 adhering firmly to the exterior surface of the second metallic oxide 23. This article is made in accordance with my method employing the apparatus which is shown in FIG. 1 of the drawing.

The methods of forming the articles which are shown in FIGS. 5 and 6 of the drawing are similar to the methods of forming the articles shown in FIG. 4 of the drawing. A first metallic oxide powder with spherical agglomerate particles, and a second metallic oxide with spherical agglomerate particles are provided to produce the resulting composite articles. Each of these metallic oxide powders are plasma sprayed separately, for example, in the apparatus shown in FIG. 1 of the drawing, upon a removable mandrel such as mandrel 14. In this manner, a first metallic oxide 19 is formed around mandrel 14, and a second metallic oxide 20 is formed around and adheres firmly to the exterior surface of the metallic oxide layer 19. Subsequently a mandrel 14 is chemically etched away as described above to provide composite metallic oxide article 18 which consists of metallic oxide portion 19 and metallic oxide portion 20.

In FIG. 6 of the drawing, composite metallic oxide article 21 comprises a first metallic oxide portion 22, a second metallic oxide portion 23 surrounding and adhering to the exterior surface of metallic oxide portion 22, and a third metallic oxide portion 24 surrounding and adhering firmly to the second metallic oxide portion 23. This article is formed in accordance with my method by providing a first metallic oxide powder of spherical agglomerate particles, and a second metallic oxide powder with spherical agglomerate particles which is selected from the above group. The second metallic oxide powder is plasma arc sprayed first onto a mandrel such as mandrel 14 in FIG. 1 of the drawing. The first metallic oxide powder is then sprayed onto the surface of the second metallic oxide powder. The second metallic oxide powder is then sprayed onto the surface of the first metallic oxide powder after which the mandrel is removed to provide a metallic oxide composite article.

Examples of preparing metallic oxide articles in accordance with the method of my invention are as follows:

Table 1 sets forth the compositions of various metallic oxide powders with spherical agglomerate particles. The powders, which are employed in my method of forming a metallic oxide article, are prepared in accordance with the method disclosed in Patent No. 3,373,119. Additionally, it is desirable to heat treat powders containing yttria in a hydrogen atmosphere prior to plasma arc spraying such powders.

TABLE I

| Composition No. | Weight percent of powder | | | |
|---|---|---|---|---|
| 1 | 85.0 $ZrO_2$ | 15.0 CaO | | |
| 2 | 86.0 $ZrO_2$ | 14.0 CaO | | |
| 3 | 85.0 $ZrO_2$ | 15.0 $Y_2O_3$ | | |
| 4 | 81.0 $ZrO_2$ | 19.0 $Y_2O_3$ | | |
| 5 | 73.8 $ZrO_2$ | 26.2 $Yb_2O_3$ | | |
| 6 | 96.0 $ThO_2$ | 4 CaO | | |
| 7 | 96.0 $ThO_2$ | 4 $Y_2O_3$ | | |
| 8 | 83.0 $ZrO_2$ | 15.0 $Y_2O_3$ | 2.0 $Fe_3O_4$ | |
| 9 | 81.0 $ZrO_2$ | 14.5 $Y_2O_3$ | 4.5 $Fe_3O_4$ | |
| 10 | 76.5 $ZrO_2$ | 13.5 CaO | 10.0 $Fe_3O_4$ | |
| 11 | 77.5 $ZrO_2$ | 12.5 $Y_2O_3$ | 10.0 $Fe_3O_4$ | |
| 12 | 69.0 $ZrO_2$ | 11.0 $Y_2O_3$ | 20 $Fe_3O_4$ | |
| 13 | 69.7 $ZrO_2$ | 13.6 CaO | 16.7 $Fe_3O_4$ | |
| 14 | 69.7 $ZrO_2$ | 13.6 CaO | 16.7 CoO | |
| 15 | 69.7 $ZrO_2$ | 13.6 CaO | 16.7 ZnO | |
| 16 | 67.5 $ZrO_2$ | 15.0 $Y_2O_3$ | 7.5 $TiO_2$ | 10.0 $Fe_3O_4$ |
| 17 | 76.0 $ZrO_2$ | 10.0 $Y_2O_3$ | 3.5 ZnO | 10.5 $Fe_3O_4$ |
| 18 | 83.5 $ZrO_2$ | 14.5 CaO | 2.0 $UO_2$ | |
| 19 | 68.0 $ZrO_2$ | 12.0 $Y_2O_3$ | 20.0 $UO_2$ | |
| 20 | 57.5 $ZrO_2$ | 14.5 $Y_2O_3$ | 28.0 $UO_2$ | |
| 21 | 59.5 $ZrO_2$ | 10.5 CaO | 30.0 $UO_2$ | |
| 22 | 51.0 $ZrO_2$ | 9.0 CaO | 40.0 $UO_2$ | |
| 23 | 72.25 $ZrO_2$ | 12.75 CaO | 10.0 $UO_2$ | 5.0 $Fe_3O_4$ |
| 24 | 63.75 $ZrO_2$ | 11.25 CaO | 20.0 $UO_2$ | 5.0 $F_3O_4$ |
| 25 | 63.75 $ZrO_2$ | 11.25 $Y_2O_3$ | 20.0 $UO_2$ | 5.0 $F_3O_4$ |

Examples with a double oxide powder

Metallic oxide articles are formed by providing metallic oxide powders of spherical agglomerate particles from compositions numbered 1–7 in Table I. Stabilized zirconia articles are produced when the particles of any one of the metallic oxide composition numbers 1–5 is plasma arc sprayed uniformly onto a rotatable copper or aluminum tube mandrel. Similarly doped thoria articles are produced when the particles of either of the metallic oxide powder composition numbers 6 or 7 is plasma arc sprayed uniformly onto a rotatable copper or aluminum tube mandrel. Subsequently, each mandrel is removed by dipping it in its appropriate etching solution and rinsing it as described above. This method results in the formation of metallic oxide articles in tube configurations.

Examples with three oxide powders

Metallic oxide articles are formed by providing metallic oxide powders of spherical agglomerate particles from the compositions numbered 8–15 and 18–22 in above Table I. Each of composition numbers 8–15 and 18–22 are plasma arc sprayed uniformly onto different rotatable copper and aluminum tube mandrels. Subsequently, each mandrel is removed by dipping it in its appropriate etching solution and rinsing it as described above. This method results in the formation of uniform metallic oxide articles in tube configurations.

Examples with four oxide powders

Metallic oxide articles are formed by providing metallic oxide powders of spherical agglomerate particles from the compositions numbered 16–17 and 23–25 in above Table I. Each of composition numbers 16, 17 and 23–25 are plasma arc sprayed uniformly onto different rotatable copper and aluminum tube mandrels. Subsequently, each mandrel is removed by dipping it in its appropriate etching solution and rinsing it as described above. This method results in the formation of metallic oxide articles in tube configurations.

What I claim as new and desire to secure by Letters Patent of the United States is:

1. In the process of preparing a refractory body containing a material from the class consisting of stabilized zirconia and doped thoria, the improvement comprising:
  (a) selecting spherical particles for the plasma arc spraying thereof in a manner to deposit said particles in a layer upon a substrate,
    (1) said spherical particles containing a plurality of physically combined finely-divided metallic oxides including a first finely-divided metallic oxide selected from the group consisting of unstabilized zirconia and doped thoria and a second finely-divided metallic oxide selected from the group consisting of CaO, a mixture of rare earth oxides, $Y_2O_3$ and $Yb_2O_3$, and
  (b) admitting said spherical particles to a plasma arc device from which said spherical particles are sprayed causing a reaction between said first and second finely-divided metallic oxides whereby anion vacancies are generated in the structure of said first metallic oxide by the cathodic substitution of metal from said second metallic oxide for metal from said first metallic oxide and
  (c) removing said substrate from said layer by chemical dissolution of said substrate.

References Cited

UNITED STATES PATENTS

| | | | |
|---|---|---|---|
| 2,990,601 | 7/1961 | Wagner | 264—80 |
| 3,248,788 | 5/1966 | Goldstein et al. | 117—105.2 |
| 2,848,349 | 8/1958 | Rechtes et al. | |
| 3,121,643 | 2/1964 | Eisenberg. | |

FOREIGN PATENTS 261,242  5/1964  Australia.

OTHER REFERENCES

F. E. Hall: "Flame-Sprayed Coatings," Product Engineering magazine, McGraw-Hill Publishing Co., Dec. 6, 1965, vol. 36; No. 25, pp. 59–64.

ROBERT F. WHITE, *Primary Examiner.*

JAMES R. HALL, *Assistant Examiner.*

U.S. Cl. X.R.

264—317